United States Patent
Nakazawa

(10) Patent No.: US 6,932,439 B2
(45) Date of Patent: Aug. 23, 2005

(54) SUPPORT STRUCTURE AND METHOD FOR SUPPORTING A HYDRAULIC UNIT OF A BRAKE SYSTEM ON A VEHICLE BODY, AND HYDRAULIC UNIT ARRANGEMENT FOR A VEHICLE BRAKE SYSTEM

(75) Inventor: Chiharu Nakazawa, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/843,380

(22) Filed: May 12, 2004

(65) Prior Publication Data

US 2004/0207254 A1 Oct. 21, 2004

Related U.S. Application Data

(63) Continuation of application No. 10/166,171, filed on Jun. 11, 2002, now Pat. No. 6,746,089.

(30) Foreign Application Priority Data

Jun. 13, 2001 (JP) ........................................ 2001-178276

(51) Int. Cl.$^7$ .............................................. B60T 17/00
(52) U.S. Cl. .............. 303/116.4; 248/634; 303/DIG. 10
(58) Field of Search .......................... 303/116.4, 119.3, 303/DIG. 10; 248/635, 659, 639

(56) References Cited

U.S. PATENT DOCUMENTS

| | | |
|---|---|---|
| 5,393,133 A | 2/1995 | Fujimoto |
| 5,464,187 A | 11/1995 | Linkner, Jr. |
| 5,697,678 A * | 12/1997 | Huber ...................... 303/116.4 |
| 5,826,845 A | 10/1998 | Lounsbury et al. |
| 6,098,949 A | 8/2000 | Robinson |
| 6,296,236 B1 | 10/2001 | Ott |
| 2003/0155809 A1 | 8/2003 | Schlitzkus et al. |

FOREIGN PATENT DOCUMENTS

| | | |
|---|---|---|
| JP | 2574748 Y2 | 4/1998 |
| JP | 10-250549 | 9/1998 |
| JP | 2001-500087 A | 1/2001 |
| WO | WO 98/56629 A1 | 12/1998 |

* cited by examiner

*Primary Examiner*—Matthew C. Graham
(74) *Attorney, Agent, or Firm*—Foley & Lardner LLP

(57) ABSTRACT

A support structure for supporting a hydraulic unit of a brake system on a vehicle body is provided. The hydraulic unit has a housing and a motor attached to a lateral side surface of the housing. The hydraulic unit has a predetermined support width and is supported at two or more support positions on a vehicle body by way of resilient members. The support structure comprises a support member for supporting the hydraulic unit in such a manner as to allow a gravitational axis of the hydraulic unit to be disposed within the support width when viewed in a side elevation. A hydraulic unit arrangement and a method for supporting the hydraulic unit are also provided.

18 Claims, 3 Drawing Sheets

SUPPORT STRUCTURE AND METHOD FOR SUPPORTING A HYDRAULIC UNIT OF A BRAKE SYSTEM ON A VEHICLE BODY, AND HYDRAULIC UNIT ARRANGEMENT FOR A VEHICLE BRAKE SYSTEM

The present application is a continuation of U.S. application Ser. No. 10/166,171, filed Jun. 11, 2002, now U.S. Pat. No. 6,746,089, the entire contents of which are incorporated herein by reference.

BACKGROUND OF THE INVENTION

The present invention relates to a support structure for supporting a hydraulic unit of a brake system on a vehicle body. More particularly, the present invention relates to a support structure of a hydraulic unit that is disposed in a braking circuit connecting between a master cylinder and a wheel cylinder for controlling a braking pressure for an anti-lock control and a traction control. Further, the present invention relates to a hydraulic unit arrangement for a vehicle brake system. Further, the present invention relates to a method for supporting a hydraulic unit of a brake system on a vehicle body.

SUMMARY OF THE INVENTION

It is an object of the present invention to provide a support structure for supporting a hydraulic unit of a brake system on a vehicle body which can prevent cantilever vibrations of the hydraulic unit thereby preventing an uncomfortable feel of a driver and deterioration of the rigidity with which the hydraulic unit is attached to a vehicle body.

It is a further object of the present invention to provide a hydraulic unit arrangement for a vehicle brake system in which the hydraulic unit is supported on a vehicle body by a support structure of the foregoing character.

It is a further object of the present invention to provide a method for supporting a hydraulic unit of a brake system on a vehicle body.

To achieve the above object, there is provided according to an aspect of the present invention a support structure for supporting a hydraulic unit of a brake system on a vehicle body, the hydraulic unit having a housing and a motor attached to a lateral side surface of the housing, the hydraulic unit having a predetermined support width and supported at two or more support positions on a vehicle body by way of resilient members, the support structure comprising a support member for supporting the hydraulic unit in such a manner as to allow a gravitational axis of the hydraulic unit to be disposed within the support width when viewed in a side elevation.

According to another aspect of the present invention, there is provided a method for supporting a hydraulic unit of a brake system on a vehicle body, the hydraulic unit having a housing and a motor attached to a lateral side surface of the housing, the hydraulic unit having a predetermined support width and supported at two or more support positions on a vehicle body by way of resilient members, the method comprising determining the support positions so as to allow a gravitational axis of the hydraulic unit to be disposed within the support width when viewed in a side elevation.

The other objects and features of this invention will become understood from the following description with reference to the accompanying drawings.

DESCRIPTION OF THE PREFERRED EMBODIMENTS

A brake system controls increase and decrease of a wheel cylinder pressure for an anti-skid control, a vehicle yaw moment control through a braking force control and a vehicle driving torque control. Such a brake system has a hydraulic unit disposed within an engine compartment. The hydraulic unit generally includes a braking circuit connecting between a master cylinder and a wheel cylinder, a housing having incorporated therein a pump and an electromagnetic valve for controlling increase and decrease a wheel cylinder pressure, and a motor that drives the pump and is attached to a lateral side surface of the housing.

A support structure for supporting such a hydraulic unit on a vehicle body is disclosed in Japanese Patent Provisional Publication No. 10-250549. The support structure includes a bracket fixedly attached to the vehicle body. The bracket has a nearly channel-shaped support section on which the housing is supported at two places thereof by way of vibration-proof rubber members.

In such a support structure, the motor is heavier than the housing so that the center of gravity of the hydraulic unit is positioned on a motor side of the center of the housing. In this instance, since the housing is supported at two support points that are located on the opposite end surfaces thereof, the center of gravity of the hydraulic unit is positioned outside the support points.

For this reason, when vibrations of the hydraulic unit are caused by variations of the hydraulic pressure in the brake circuit that are caused by the drive of the motor and the control of the wheel cylinder pressure, there are caused in the hydraulic unit, cantilever vibrations, i.e., vibrations of the center of gravity that is positioned outside the support points.

Such cantilever vibrations causes a problem that uncomfortable vibrations are imparted to the driver by way of the brake piping and master cylinder and a problem that fastening bolts that fasten the hydraulic unit to the vehicle body tend to become loose to deteriorate the rigidity with which the hydraulic unit is attached to the vehicle body.

Further, when the center of gravity of the hydraulic unit is positioned on a brake piping side of the center of the housing, there occurs such a condition in which the weight of the hydraulic unit is applied axially of the brake piping so that vibrations of the brake pipes are enhanced by the cantilever vibrations.

A support structure for supporting a hydraulic unit of a brake system on a vehicle body according to the present invention, which is free from the above described problem, will be described with reference to the attached drawings.

Figure 1:
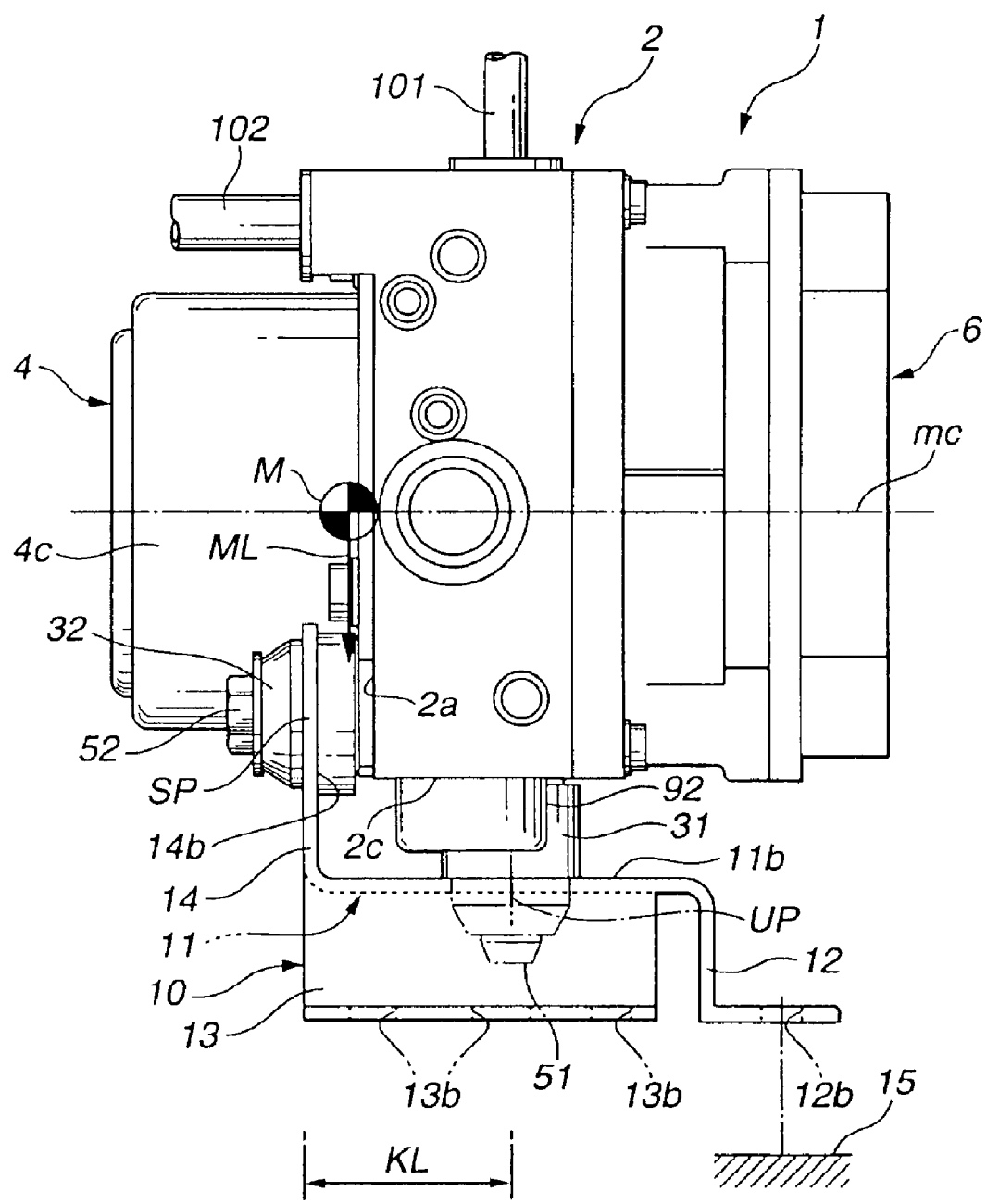
FIG. 1 is a side elevation of a support structure for supporting a hydraulic unit of a brake system on a vehicle body according to a first embodiment of the present invention.
Figure 2:
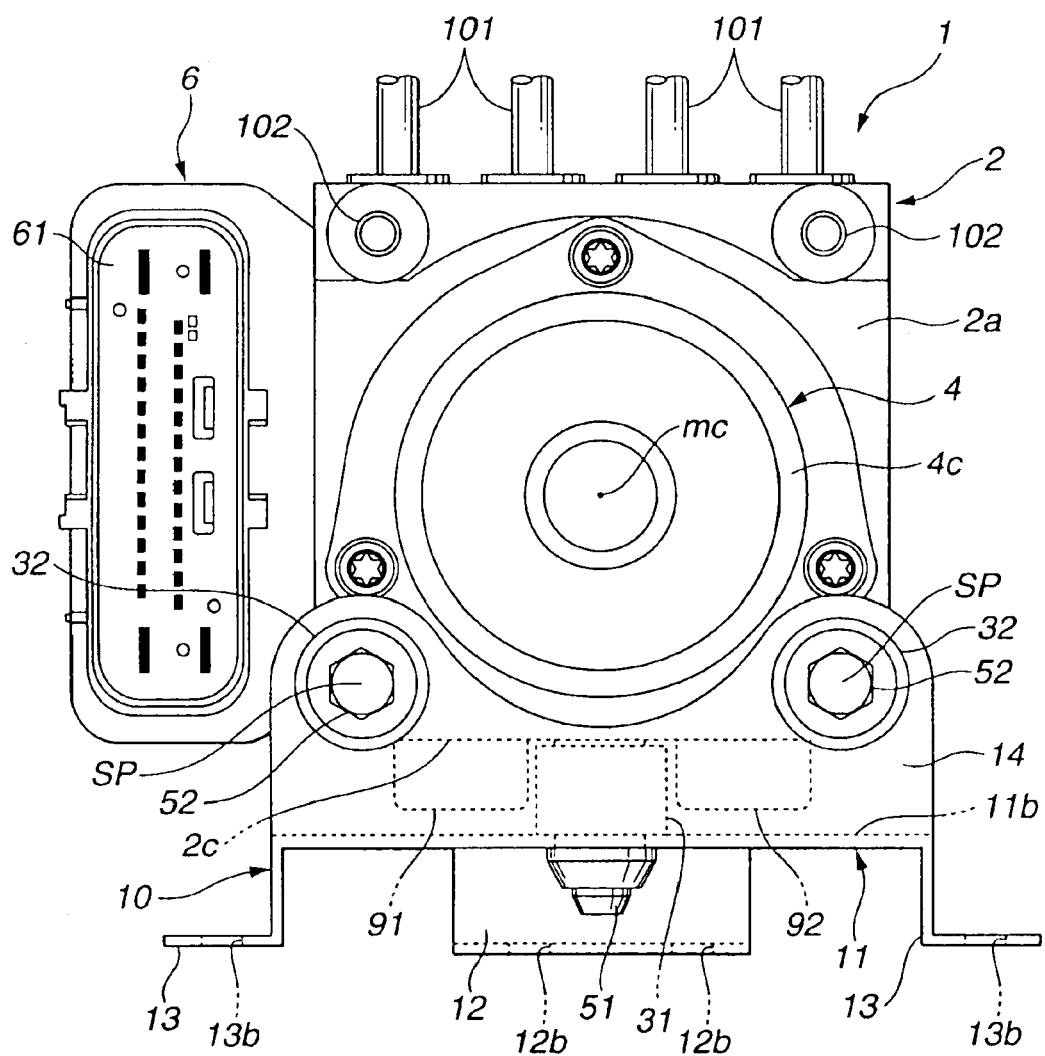
FIG. 2 is an elevation of the support structure of FIG. 1.

Referring first to FIG. 1, a hydraulic unit is generally indicated by 1 and includes housing 2, motor 4 attached to one 2a of lateral side surfaces that are opposed left and right in FIG. 2, and case 6 attached to the other of the lateral side surfaces.

Within housing 2 are incorporated, though not shown, a portion of a brake circuit connecting between a master cylinder and a wheel cylinder and, though also not shown, a plunger pump, etc.

Further, though not shown, a plurality of openings is formed in motor attaching lateral side surface 2a and an upper surface of housing 2 and connected with brake pipes 101, 102, respectively.

The motor 4, which has a center line mc, is provided for driving the plunger pump (not shown) and is covered by motor case 4c attached to housing 2 and doubling as a yoke.

Case 6 accommodates therewithin, though not shown, an electromagnetic valve and an electronic unit for controlling a drive of the electromagnetic valve and motor 4. On the side portion of case 6 is disposed connector 61 that is connected by an outside electric circuit so as to supply electric signals to the above-described electronic unit and motor 4.

In the meantime, to the lower surface of housing 2 are attached reservoirs 91, 92.

Hydraulic unit 1 is fixedly attached to vehicle body 15 by means of bracket 10.

Bracket 10 is generally rectangular when viewed in plan and includes rectangular lower support section 11, leg sections 12, 13, 13 extending downward from respective three sides of lower support section 11 to have ends to be abuttingly engaged with vehicle body 15, and lateral side support section 14 extending upward from the remaining side of lower support section 11 and disposed opposite to motor attaching lateral side surface 2a of housing 2. In the meantime, leg sections 12, 13 are formed with bolt holes 12b, 13b into which bolts (not shown) are to be inserted.

Lower support section 11 is formed with a bolt hole (not shown) a center axis of which is located on a vertical plane on which motor axis mc of motor 4 is located. Vibration-proof rubber member or resilient member 31 is fitted in the bolt hole of the lower support section 11. Bolt 51 is inserted into vibration-proof rubber member 31 from a lower side support surface 11b of lower support section 11 to extend therethrough and fastened to lower surface 2c of housing 2. By this, vibration-proof rubber member 31 is disposed between lower side support surface 11b that is the upper surface of lower support section 11 and lower surface 2c of housing 2.

Lateral side support section 14 of bracket 10 is formed with bolt holes (not shown) at which lateral side support positions SP are located. Lateral side support positions SP are disposed at horizontally opposite end portions of lateral side support section 14 as shown in FIG. 2. In the bolt holes of lateral side support section 14 are fitted vibration-proof rubber members or resilient members 32. Bolts 52 are inserted into vibration-proof rubber members 32 from the left-hand side in FIG. 1 (left and right in FIG. 1 is a front-to-rear direction of a vehicle) to extend therethrough and fastened to motor attaching lateral side surface 2c of housing 2. By this, each vibration-proof rubber member 32 is disposed between lateral side support surface 14b of lateral side support section 14 and motor attaching lateral side surface 2a of housing 2.

As shown in FIG. 1, center M of gravity of hydraulic unit 1 is positioned on the motor 4 side of the center of housing 2 since motor 4 is heavy. In this embodiment, gravitational axis ML that is an axis indicative of the direction of gravity is disposed so as to be within support width KL that is an interval between lower support position UP and lateral side support position SP.

Since the center M of gravity of hydraulic unit 1 is disposed within the support width KL between the support positions UP, SP, cantilever vibrations as discussed with respect to the related art hereinbefore are not caused even when hydraulic unit 1 is caused to vibrate. Thus, as compared with the support structure of the related art, the vibration of the hydraulic unit 1 can be suppressed and made smaller, thus making it possible to prevent an uncomfortable feel of a driver and deterioration of the rigidity with which hydraulic unit 1 is attached to vehicle body 15 by bolts 51, 52.

More specifically, in this embodiment, brake pipes 101, 102 are disposed on the remoter side of center M of gravity of hydraulic unit 1 with respect to support positions SP, UP. Thus, if cantilever vibrations are caused in hydraulic unit 1, brake pipes 101, 102 are caused to vibrate and particularly brake pipes 102 are pushed axially thereof, thus tending to transmit those vibrations to the driver. However, in this embodiment, cantilever vibrations of hydraulic unit 1 can be suppressed as described above, thus making it possible to solve the problem otherwise caused by vibrations of pipes 101, 102.

Figure 3:
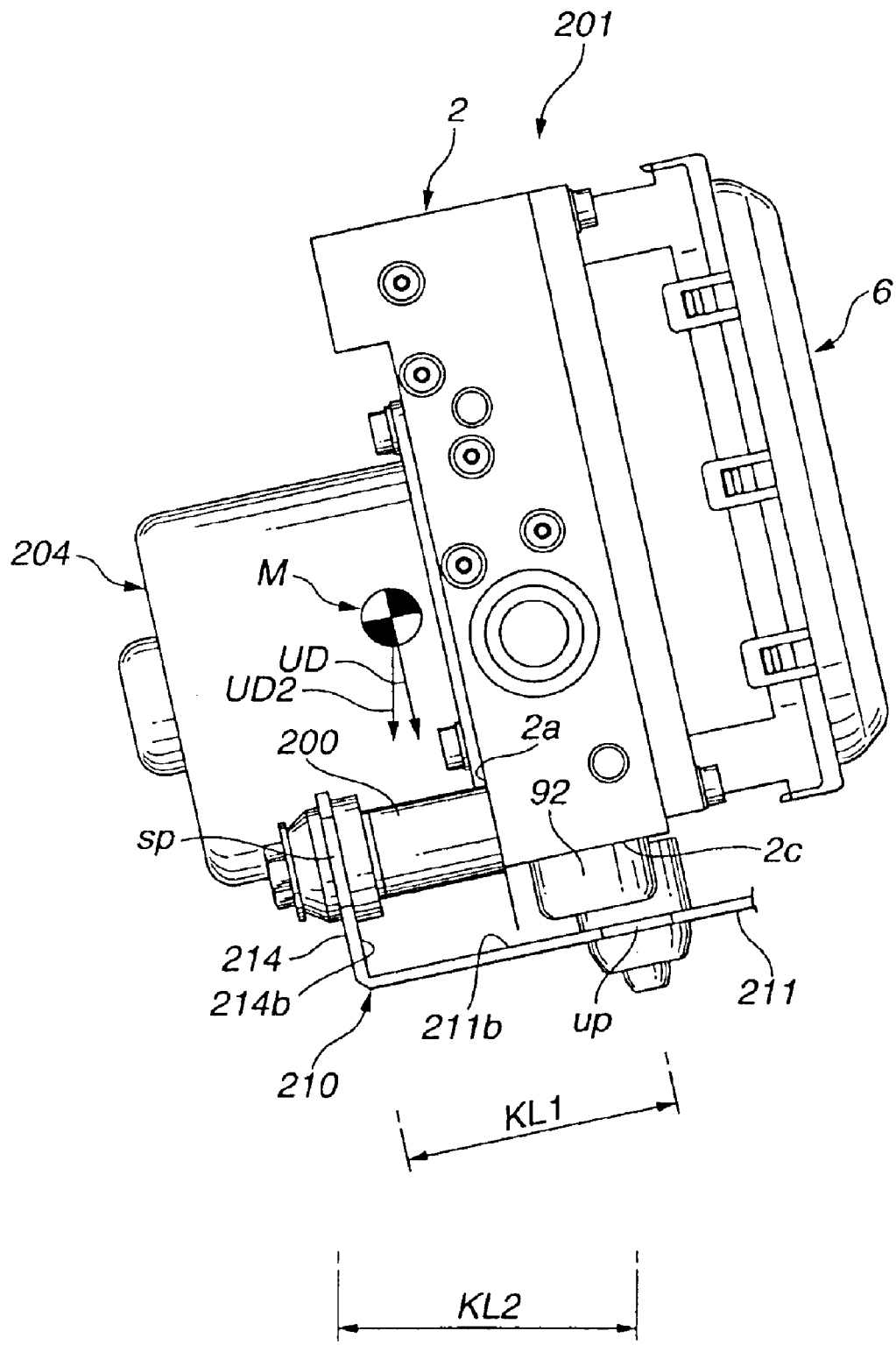
FIG. 3 is a side elevation of a support structure for supporting a hydraulic unit of a brake system on a vehicle body according to a second embodiment of the present invention.

FIG. 3 shows a second embodiment of the present invention. In FIG. 3, like parts and portions to those of the previous embodiment described with reference to FIGS. 1 and 2 will be designated by like reference characters and will not be described again for brevity.

In this embodiment, motor 204 of hydraulic unit 201 is larger in capacity and in axial size as compared with that in the previous embodiment. As a result, as shown in FIG. 3, center M of gravity is moved more away from housing 2 into a position nearer to the center of motor 204 as compared with that in the previous embodiment.

For this reason, bracket 210 is structured so that lower support section 211 has a larger size in the front-to-rear direction (in the left to right direction in FIG. 3) and lateral side support position SP on side support section 214 is disposed more away from lower side support position UP. By moving lateral side support position SP more away from lower side support position UP in the above manner, the distance between vibration-proof rubber member 32 and motor attaching lateral side surface 2a of housing 2 becomes larger. Thus, in this embodiment, extension fixing member 200 in the form of a metallic tube is disposed between vibration-proof rubber member 32 and motor attaching lateral side surface 2a of housing 2.

Further, in this embodiment, bracket 210 may be attached to the vehicle body, with lower side support section 211 being held horizontal or inclined according to the necessity. Namely, lower side support section 211 may be disposed to be nearly horizontal so that the gravitational axis extending from center M of gravity coincides with arrow UD shown in FIG. 3 or bracket 210 may be inclined so that arrow UD2 is directed vertically or may be inclined in the opposite direction.

Further, bracket 210 may be attached to the vehicle body directly or a support member (not shown) may be interposed between the vehicle body and bracket 210.

Though center M of gravity in this embodiment is more distant from housing 2 as compared with that in the first embodiment, this embodiment can produce substantially the same effect as the first embodiment by using modified bracket 210 and extension fixing member 200 thereby disposing center M of gravity within the support width (i.e., in FIG. 3, KL1 is the support width when the gravitational axis is UD and KL2 is the support width when the gravitational axis is UD2).

The entire contents of Japanese Patent Application P2001-178276 are incorporated herein by reference.

Although the invention has been described above by reference to certain embodiments of the invention, the invention is not limited to the embodiments described above. Modifications and variations of the embodiment described above will occur to those skilled in the art, in light of the above teachings. For example, while the number of support positions of housing 2 is described as three, it can be two or more than four so long as support positions UP, SP are adapted to provide predetermined support width KL. The scope of the invention is defined with reference to the following claims.

What is claimed is:

1. A support structure for supporting a hydraulic unit of a brake system on a vehicle body, wherein the hydraulic unit has a housing with lateral side surfaces and a lower side surface that enclose the hydraulic unit, wherein a motor is attached to one of the lateral side surfaces of the housing, the support structure comprising:
   a support member for supporting the hydraulic unit on a vehicle body at two or more support positions by way of resilient members,
   wherein the support member is attached at one of the support positions to one of the lateral side surfaces of the housing and at another of the support positions to the lower side surface of the housing.

2. A support structure according to claim 1, wherein said one of the lateral side surfaces of the housing to which the support member is attached at said one of the support positions and said one of the lateral side surfaces to which the motor is attached are the same.

3. A support structure according to claim 2, wherein the support member supports the hydraulic unit on a vehicle body at three support positions by way of the resilient members, and wherein the support member is attached at two of the support positions to said one of the lateral side surfaces of the housing.

4. A support structure according to claim 1, wherein one of the resilient members is disposed between one of the lateral side surfaces of the housing and the support member so as to have a first support axis, and another of the resilient members is disposed between the lower side surface of the housing and the support member so as to have a second support axis that extends substantially perpendicularly to the first support axis.

5. A hydraulic unit arrangement for a vehicle brake system comprising:
   a hydraulic unit having a housing with lateral side surfaces and a lower side surface that enclose the hydraulic unit, wherein a motor is attached to one of the lateral side surfaces of the housing; and
   a support member for supporting the hydraulic unit on a vehicle body at two or more support positions by way of resilient members,
   wherein the support member is attached at one of the support positions to one of the lateral side surfaces of the housing and at another of the support positions to the lower side surface of the housing.

6. A hydraulic unit arrangement according to claim 5, wherein said one of the lateral side surfaces of the housing to which the support member is attached at said one of the support positions and said one of the lateral side surfaces to which the motor is attached are the same.

7. A hydraulic unit arrangement according to claim 6, wherein the support member supports the hydraulic unit on a vehicle body at three support positions by way of the resilient members, and wherein the support member is attached at two of the support positions to said one of the lateral side surfaces of the housing.

8. A hydraulic unit arrangement according to claim 5, wherein one of the resilient members is disposed between one of the lateral side surfaces of the housing and the support member so as to have a first support axis, and another of the resilient members is disposed between the lower side surface of the housing and the support member so as to have a second support axis that extends substantially perpendicularly to the first support axis.

9. A support structure for supporting a hydraulic unit of a brake system on a vehicle body, wherein the hydraulic unit has a housing with lateral side surfaces and a lower side surface, wherein a motor is attached to one of the lateral side surfaces of the housing, the support structure comprising:
   a support member for supporting the hydraulic unit on a vehicle body at two or more support positions by way of resilient members;
   wherein the support member is attached at one of the support positions to one of the lateral side surfaces of the housing without interposing therebetween any additional bracket and at another of the support positions to the lower side surface of the housing without interposing therebetween any additional bracket.

10. A support structure according to claim 9, wherein said one of the lateral side surfaces of the housing to which the support member is attached at said one of the support positions and said one of the lateral side surfaces to which the motor is attached are the same.

11. A support structure according to claim 10, wherein the support member supports the hydraulic unit on a vehicle body at three support positions by way of the resilient members, and wherein the support member is attached at two of the support positions to said one of the lateral side surfaces of the housing.

12. A support structure according to claim 9, wherein one of the resilient members is disposed between one of the lateral side surfaces of the housing and the support member so as to have a first support axis, and another of the resilient members is disposed between the lower side surface of the housing and the support member so as to have a second support axis that extends substantially perpendicularly to the first support axis.

13. A hydraulic unit for arrangement for a vehicle brake system comprising:
   a hydraulic unit having a housing with lateral side surfaces and a lower side surface, wherein a motor is attached to one of the lateral side surfaces of the housing; and
   a support member for supporting the hydraulic unit on a vehicle body at two or more support positions by way of resilient members;
   wherein the support member is attached at one of the support positions to one of the lateral side surfaces of the housing without interposing therebetween any additional bracket and at another of the support positions to the lower side surface of the housing without interposing therebetween any additional bracket.

14. A hydraulic unit arrangement according to claim 13, wherein said one of the lateral side surfaces of the housing to which the support member is attached at said one of the support positions and said one of the lateral side surfaces to which the motor is attached are the same.

15. A hydraulic unit arrangement according to claim 14, wherein the support member supports the hydraulic unit on a vehicle body at three support positions by way of the resilient members, and wherein the support member is attached at two of the support positions to said one of the lateral side surfaces of the housing.

16. A hydraulic unit arrangement according to claim 13, wherein one of the resilient members is disposed between one of the lateral side surfaces of the housing and the support member so as to have a first support axis, and another of the resilient members is disposed between the lower side surface of the housing and the support member so as to have a second support axis that extends substantially perpendicularly to the first support axis.

17. A support structure for supporting a hydraulic unit of a brake system on a vehicle body, wherein the hydraulic unit has a housing with lateral side surfaces and a lower side surface, wherein a motor is attached to one of the lateral side surfaces of the housing, the support structure comprising:
  a support member for supporting the hydraulic unit on a vehicle body at two or more support positions by way of resilient members,
  wherein the support member has at one of the support positions a lateral side support section disposed opposite to one of the lateral side surfaces of the housing,
  wherein the support member has at another of the support positions a lower support section disposed under the lower side surface of the housing, and
  wherein the support member is attached at the lateral side support section to the lateral side surface of the housing to which the lateral side support section is opposed and at the lower support section to the lower side surface of the housing.

18. A hydraulic unit arrangement for a vehicle brake system comprising:
  a hydraulic unit having a housing with lateral side surfaces and a lower side surface, wherein a motor is attached to one of the lateral side surfaces of the housing; and
  a support member for supporting the hydraulic unit on a vehicle body at two or more support positions by way of resilient members,
  wherein the support member has at one of the support positions a lateral side support section disposed opposite to one of the lateral side surfaces of the housing,
  wherein the support member has at another of the support positions a lower support section disposed under the lower side surface of the housing;
  wherein the support member is attached at the lateral side support section to the lateral side surface of the housing to which the lateral side support section is opposed and at the lower support section to the lower side surface of the housing.

* * * * *